Oct. 2, 1956

K. G. DROSAKIS 2,765,399

TELEVISION LAMP

Filed May 27, 1954

2 Sheets-Sheet 1

Kostas G. Drosakis

INVENTOR

BY C. A. Snow & Co.

ATTORNEYS.

Oct. 2, 1956 K. G. DROSAKIS 2,765,399

TELEVISION LAMP

Filed May 27, 1954 2 Sheets-Sheet 2

Kostas G. Drosakis

INVENTOR

BY C. A. Snow & Co.

ATTORNEYS.

United States Patent Office 2,765,399

Patented Oct. 2, 1956

2,765,399

TELEVISION LAMP

Kostas Gus Drosakis, West Palm Beach, Fla.

Application May 27, 1954, Serial No. 432,754

1 Claim. (Cl. 240—81)

This invention relates to a shielded lamp for television reception and more particularly to an electric lamp which will be normally positioned on the top of a television set cabinet or the like in a home.

It is a primary object of this invention to provide a lamp for use in a room having a television set therein, the lamp having a substantial base for setting on top of the bare flat surface of the set and upstanding reflectors on the base in front of and behind an electric light bulb to prevent any glare of the bulb from being reflected in the view screen of the set which glare or reflection may disturb the persons viewing the television set screen.

It is another object of this invention to provide a television lamp of the kind to be more particularly described hereinafter which is particularly adapted to provide ordinary light in a room which has a television set while preventing any glare or reflection of the lamp from disturbing the televised picture to be viewed. The lamp being so designed that it will contribute greatly to the good taste of the room furnishings.

Other and further objects and advantages of the invention will be hereinafter described and the novel features thereof defined in the appended claim.

Figure 1:
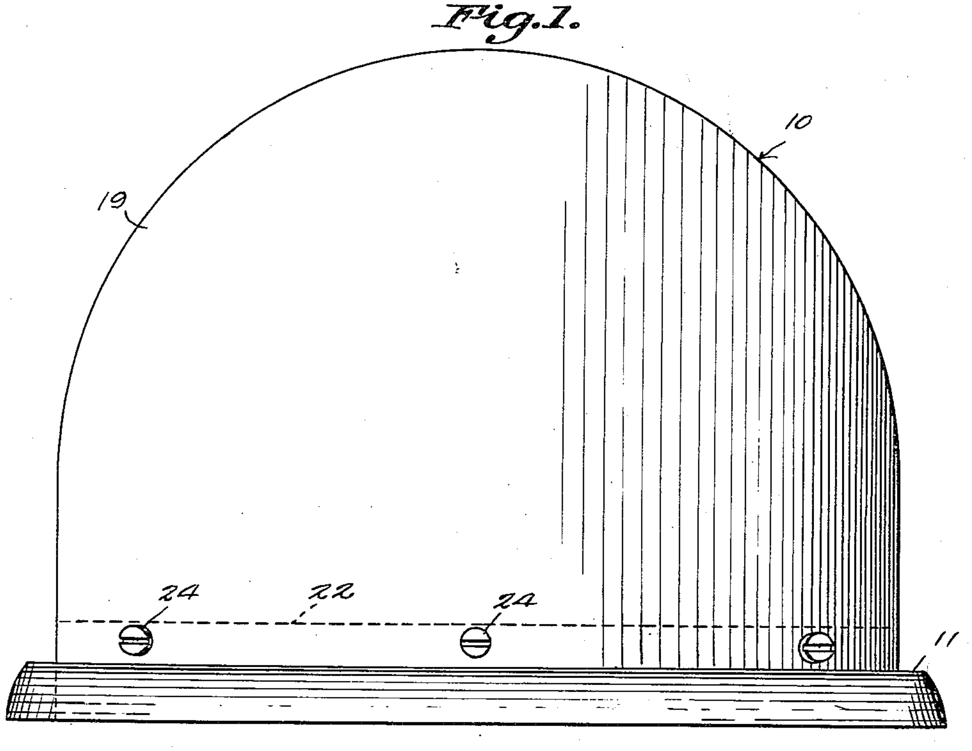
Fig. 1 is a front elevation of a television lamp constructed according to my invention.

In a room having a television set and also a number of lamps in the room the person viewing the television set is frequently disturbed by the glare or reflection of one or more lamps in the viewing screen of the shielded set. It is with this purpose in mind that I have designed the present television lamp for use either on top of the television or on top of a stand in the same room as the television set so that the television screen can be clearly viewed by the audience without any glare or reflection appearing on the screen of the set to be viewed.

The shielded lamp constructed according to my invention is designated generally by the reference numeral 10 in the drawings and the lamp 10 is provided with a weighted base 11 for resting on top of the television set cabinet or other object nearby.

A light bulb 12 of the incandescent type is to be used in the shielded lamp stand and the light bulb is placed in a socket 14 mounted on top of the base 11. The socket 14 is provided with a switch handle 15 extending outwardly therefrom in convenient position.

An electric cord 16 is extended to the base 11 having a portion thereof extending in and through a horizontal groove 17 to a vertically extending bore 18 which bore communicates directly with one end of the groove 17 so that the cord 16 may be readily engaged therein to provide a light source for the light bulb 12 in the lamp 10.

Figure 2:
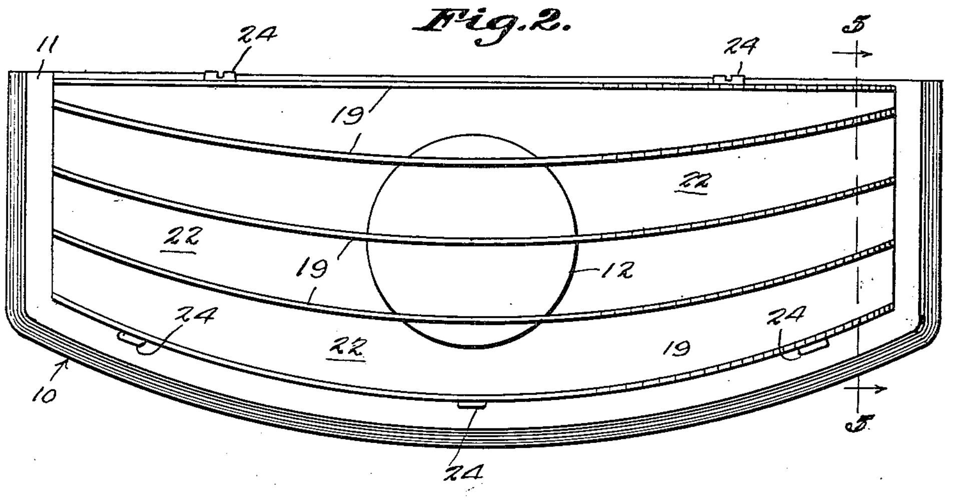
Fig. 2 is a top plan view.
Figure 3:
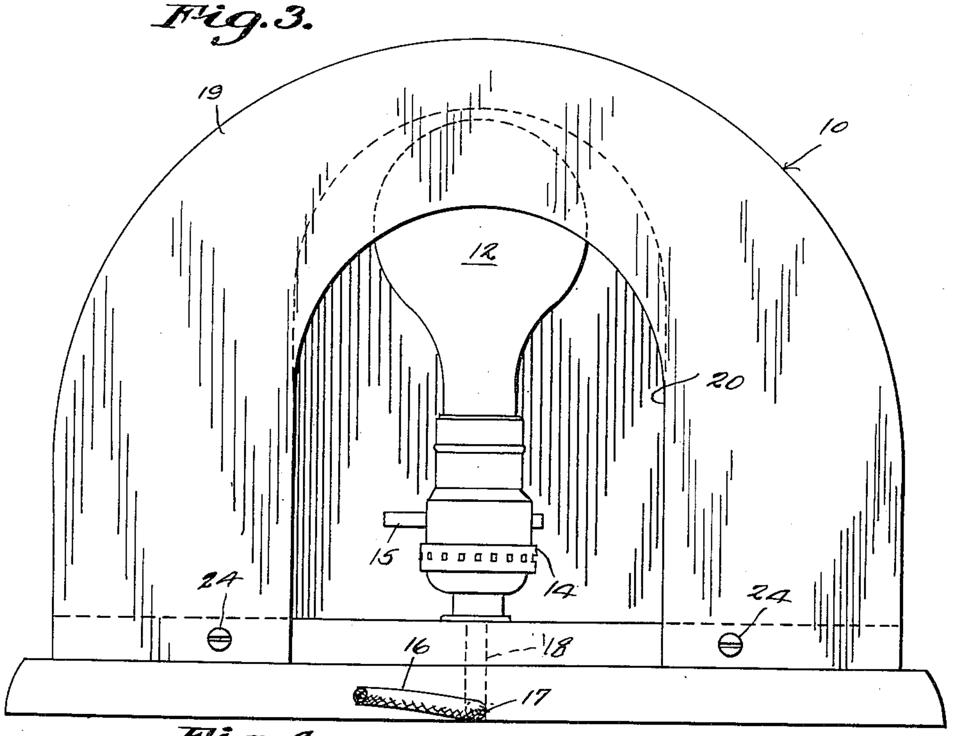
Fig. 3 is a rear elevation.

In order to prevent the reflection and glare from the light bulb 12 from being reflected in the viewing screen of the television set I have provided a plurality of reflector plates 19 which are mounted at their lower ends on the upper surface of the base. The front plate 19 has a continuous surface to occlude light forwardly of the base 11, as seen in Figs. 1 and 2.

The reflectors 19 rearwardly of the forward reflector plate 19 are provided with an arched opening 20, of sufficient height to remove and replace the light bulb and the light bulb socket. The arched openings 20 extend upwardly from the base 11.

As will be noted from the drawings all of the reflectors are of the same substantial configuration being flat at the lower end and arcuate at the upper end with the curved surfaces of the reflectors being located in spaced relation on the weighted base 11. Also, the reflector plates 19 are concavo-convex in plan view, Fig. 2, with the concave side facing to the rear, so that glare and light from the light bulb will be directed rearwardly of the shielded lamp.

Spacers 22 are secured to the upper side of the base so that the reflectors rearwardly of the foremost reflector may be securely mounted. The reflector plates 19 are secured by screws 24 which engage through the outermost of the plates and into the spacers. The spacers 22 may be glued to the upper surface of the base 11 or otherwise secured thereto either after or before the reflectors 19 are mounted on the base.

The base 11 is preferably weighted by being formed or porcelain or some other weighted material so that the television lamp will not be easily upset.

*Use and operation*

Figure 4:
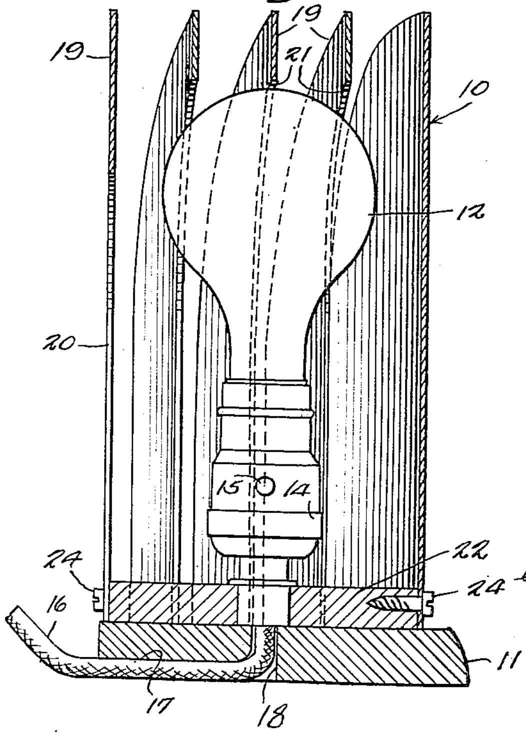
Fig. 4 is a side elevation of a center section, showing the lamp.
Figure 5:
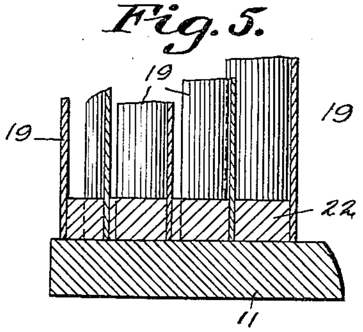
Fig. 5 is a fragmentary detailed section in elevation on the line 5—5 of Fig. 2.

The shielded lamp is placed so that the front, Fig. 1, is toward the television screen, or the audience when placed on and above the television set. It is noted, Fig. 2, that full light passes vertically upward, but that much direct light is occluded laterally, Figs. 4 and 2.

The light emitted by reflection is well diffused and soft. The total light is sufficient for the room and proper placement of my shielded lamp, completely avoids interference with the television reception.

While the specific details of one embodiment of this invention have been herein shown and described, the invention is not confined thereto as changes and alterations may be made without departing from the spirit and scope thereof as defined in the appended claim.

I claim:

A shielded lamp comprising an opaque base, a lamp socket mounted thereon and a series of curved upstanding reflector plates associated with the lamp, the first of the series being opaque, having a continuous uninterrupted convex outer surface, and being so positioned as to occlude all direct and reflected light to the front, the series being so positioned as to occlude a substantial portion of the direct light to the side, the plates of the series being concave on the rear side and mounted in tandem spaced relation on the base so as to concentrate the reflected light rearwardly, the plates of the series being curved in a horizontal plane, and a flat upstanding opaque reflector plate mounted on the base and spaced from the series of reflector plates and having an opening therethrough for access to the lamp socket and omission of light rearwardly and downwardly, said curved reflector plates having arch openings and all plates being mounted on the base.

References Cited in the file of this patent

UNITED STATES PATENTS

| | | |
|---|---|---|
| 1,767,418 | Williamson | June 24, 1930 |
| 1,767,419 | Williamson | June 24, 1930 |
| 1,843,781 | Pearson | Feb. 2, 1932 |
| 1,899,272 | Hertz | Feb. 28, 1933 |
| 2,199,985 | Craib | May 7, 1940 |
| 2,267,796 | Lezebnick | Dec. 30, 1941 |
| 2,699,492 | Cookenboo | Jan. 11, 1955 |